US006278073B1

(12) United States Patent
Tsuzura et al.

(10) Patent No.: US 6,278,073 B1
(45) Date of Patent: Aug. 21, 2001

(54) GAS INSULATED SWITCHING APPARATUS

(75) Inventors: Keiichi Tsuzura; Kazuhiko Takahashi; Junzo Kida, all of Hitachi; Minoru Yabuki, Tokai-mura; Yasuhito Watanabe, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/366,324

(22) Filed: Aug. 2, 1999

(30) Foreign Application Priority Data

Aug. 3, 1998 (JP) ................................................ 10-218788

(51) Int. Cl.[7] .............................. H02B 5/00; H01H 33/00
(52) U.S. Cl. .............................. 218/43; 361/117; 361/604
(58) Field of Search .................................... 361/604–625, 361/117–120; 218/43–50, 55, 67, 68, 79, 80

(56) References Cited

U.S. PATENT DOCUMENTS 3,629,660 * 12/1971 Kamada et al. ....................... 317/69
4,136,299 * 1/1979 Nagai et al. ..................... 361/120 X
4,553,189 * 11/1985 Pivit et al. ........................... 361/119
5,574,613 * 11/1996 Shirakawa et al. .................. 361/117

FOREIGN PATENT DOCUMENTS 60-117610 6/1985 (JP) .
8-265925 10/1996 (JP) .

* cited by examiner

*Primary Examiner*—J. R. Scott
(74) *Attorney, Agent, or Firm*—Mattingly, Stanger & Malur, P.C .

(57) ABSTRACT

A gas insulated switching apparatus has lightning arrestors in a line side unit. Each lightning arrestor is mounted to be moved linearly into and out of connection with a corresponding conductor. Specifically, the cover which supports the lightning arrestor is disposed beneath the bottom plate of the vessel of the line side unit. The lightning arrestors are connected to a monitor of an operating device beneath the line side unit. Since the lower portion of the lightning arrestors are connected to the monitor, the length of the connection lines is made sufficiently short.

3 Claims, 3 Drawing Sheets

GAS INSULATED SWITCHING APPARATUS

BACKGROUND OF THE INVENTION

1. Field of the Invention

This invention is related to gas insulated switching apparatus, and especially, it concerns gas insulated switching apparatus which compacted line side unit.

2. Description of Related Art

Gas insulated switching apparatus are configured such that electric conductors for electrically connecting circuit-breakers, disconnectors, earth switches, and transformers for instruments to each other are housed in enclosed vessels filled with insulating gas. These gas insulated switching apparatuses advantageous in terms of miniaturization, insulating performance, and safety have been extensively installed at electric stations such as transforming stations.

In a prior art gas insulated switching apparatus disclosed in Japanese Patent Laid-open No. Hei 4-109808, a disconnector unit is provided between a lightning arrestor element unit and a high voltage conductor unit in such a manner that the lightning arrestor element unit is movable to open/close the disconnector, and an operating unit is disposed outside a vessel of the lightening arrestor element unit for opening/closing the disconnector by driving the lightening arrestor element unit using the external operating unit, thereby allowing the lightning arrestor element unit to be contacted with or separated from the high voltage conductor unit.

In a prior art gas insulated switching apparatus disclosed in Japanese Patent Laid-open No. Hei 8-265925 and Japanese Utility Model No. Sho 60-117610, a movable contact is provided on a lightening arrestor main body on the power supply side, and a straightforward sliding shaft is provided on the lightning arrestor on the earth side in such a manner as to air-tightly pass through the bottom plate of a tank, wherein the lightning arrestor main body is vertically moved to be turned on/on.

However, the concrete means for compacting the container that lightning arrester was put was not considered in conventional gas insulated switching apparatus.

SUMMARY OF THE INVENTION

A first object of the present invention is to provide a gas insulated switching apparatus which compacted the container that lightning arrester was put.

To achieve the above object, according to the present invention. there is provided a gas insulated switching apparatus including a line side unit has a electric power line, which comprising, a lightning arrester is established in the line side unit, which relatively moves for the container of the line side unit, and connected on/off the electric power line. and a cover which supports said lightning arrester is in the position which is lower than the basal plane of the line side unit

DESCRIPTION OF THE PREFERRED EMBODIMENTS

Figure 1:
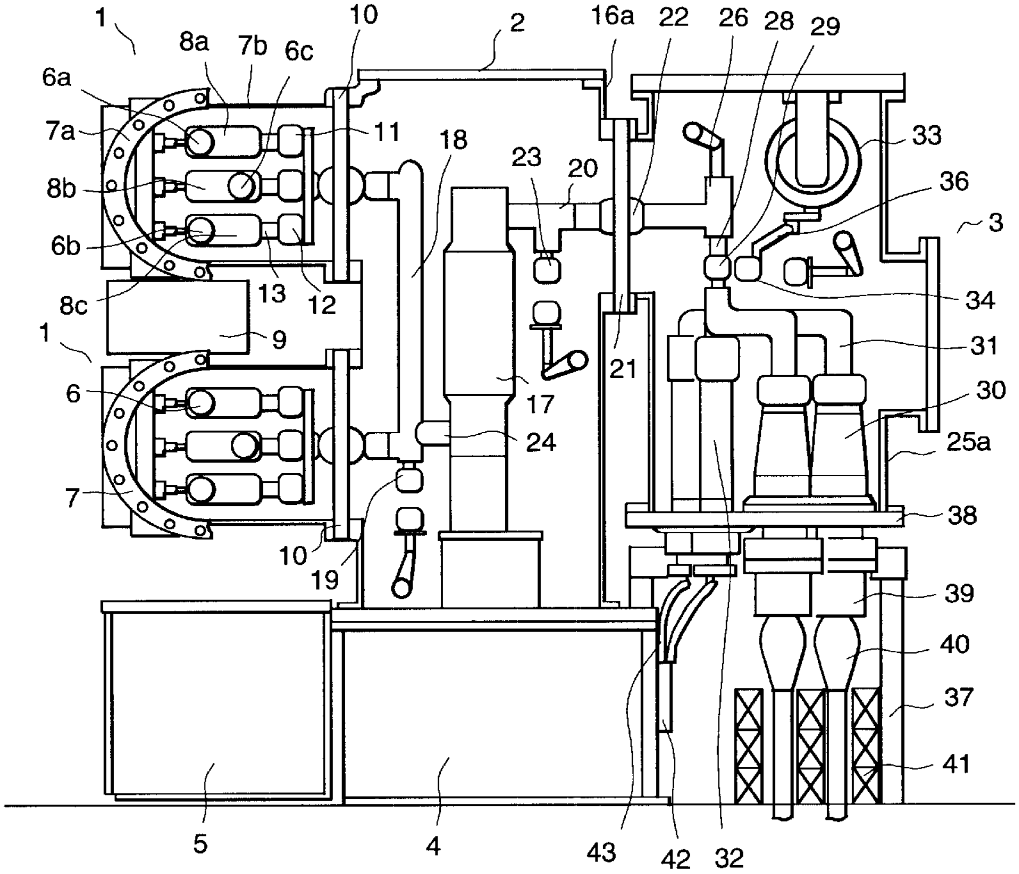
FIG. 1 is a vertical sectional view of a gas insulated switching apparatus according to one embodiment of the present invention.
Figure 2:
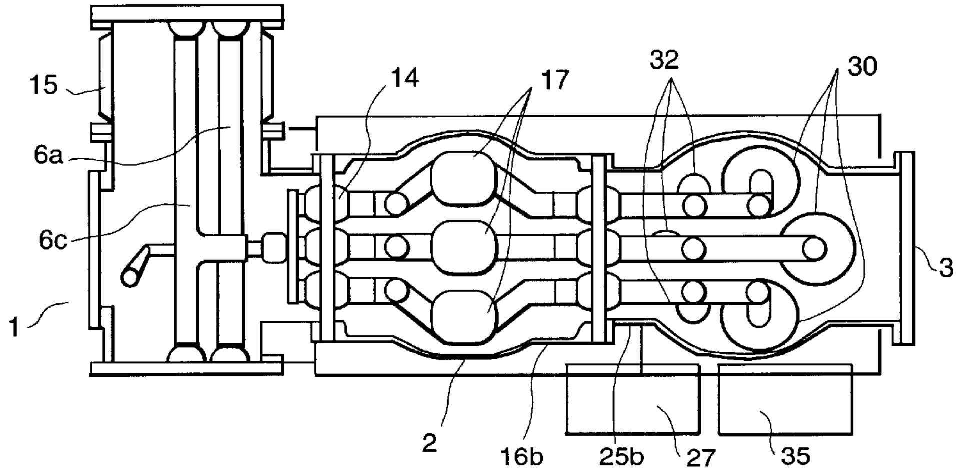
FIG. 2 is a transverse sectional view of the gas insulated switching apparatus in the embodiment.

One embodiment of the present invention will be described with reference to FIGS. 1 to 3. As shown in FIGS. 1 and 2, a gas insulated switching apparatus in this embodiment includes bus line units 1, a circuit-breaker unit 2, and a line side unit 3. Two pieces of the bus line units 1 are provided in the vertical direction on one side of the circuit-breaker unit 2, and the line side unit 3 is connected to the other side of the circuit-breaker unit 2. An operating device 4 is disposed under the circuit-breaker unit 2 and a control box 5 is disposed on one side of the operating device 4.

The configuration of the bus line unit 1 will be described below. In a bus line vessel 7, three-phase bus line conductors 6*a*, 6*b* and 6*c* are disposed at respective vertexes of an isosceles triangle. The bus line vessel 7 is formed by a combination of a cylindrical vessel portion 7*a* extending in the axial direction of the bus line conductor 6 and a cylindrical vessel portion 7*b* extending in the direction perpendicular to the cylindrical vessel portion 7*a*. The upper and lower bus line conductors 6*a* and 6*b* are arranged in the vertical direction on the center line of the cylindrical vessel portion 7*a*, and the bus line conductor 6*c* is arranged on the circuit-breaker unit 2 side. Flanges are provided at both ends of the cylindrical vessel portion 7*a* of the bus line vessel 7, and an expansion joint 15 configured as a bellows is connected to one of the ends of the cylindrical vessel portion 7*a*.

Branch conductors 8*a*, 8*b* and 8*c* of the bus line conductors 6*a*, 6*b* and 6*c* are arranged in a row in the vertical direction at the center line portion of the cylindrical vessel portion 7*b*. A movable electrode 13 is provided at the center portion of each of the branch conductors 8*a*, 8*b* and 8*c*. The movable electrode 13 is driven to be reciprocated in each of the branch conductors 8*a*, 8*b* and 8*c* by an operating device 9 disposed between the two bus line vessels 7. Fixed electrodes 12 are fixed, via conductors 11, to an insulating spacer 10 provided between the bus line unit 1 and the circuit-breaker unit 2. The movable electrode 13 and the fixed electrode 12 constitute a disconnector. The insulating spacer 10 is provided between each of the upper and lower bus line units 1 and the circuit-breaker unit 2 for keeping air-tightness, and conductor connecting portions 14 are arranged in a row in the horizontal direction at the center line portion of the insulating spacer 10 The conductor connecting portions 14 are connected to conductors 11 in the circuit-breaker unit 2

The configuration of the circuit-breaker unit 2 will be described below. The vessel of the circuit-breaker unit 2 is composed of a cylindrical vessel portion 16*a* having an axial line in the vertical direction, and cylindrical vessel portions 16*b* formed on both sides in the horizontal direction on the upper side of the cylindrical vessel portion 16*a* and a cylindrical vessel portion 16*b* formed on the bus line unit side in the horizontal direction on the lower side of the cylindrical vessel portion 16*a*. Threephase circuit-breakers 17 are arranged in the same direction as the axial direction of the bus line conductor 6 at the center line portion of the cylindrical vessel portion 16*a*.

The conductor connecting portions 14 provided on the upper insulating spacer 10 are connected to the conductor connecting portions 14 provided on the lower insulating spacer 10 via reciprocating conductors 18, and the lower sides of the reciprocating conductors 18 are connected to the lower sides of the breaking portions of the circuit-breakers 17 via conductors 24.

Fixed electrodes 19 of earth devices, which are provided on the lower portions of the reciprocating conductors 18, are allowed to be contacted with or separated from movable electrodes driven by an operating device (not shown) provided outside the vessel of the circuit-breaker unit 2.

Connecting conductors 20 are provided on the upper portions of the circuit-breakers 17. The connecting conductors 20 are connected to conductor connecting portions 22 arranged in a row in the transverse direction on an insulating spacer 21 provided between the circuit-breaker unit 2 and the line side unit 3. Branch portions are provided on the connecting conductors 20 on the circuit-breaker portion side, and fixed electrodes 23 of earth devices are provided on end portions of the branch portions. Movable electrodes reciprocated by an operating device (not shown) provided outside the vessel of the circuit-breaker unit 2 are allowed to be contacted with or separated from the fixed electrodes 23.

Of three-phase of the circuit-breakers 17, the center circuit-breaker 17 is arranged on the straight line connecting the center conductor connecting portion 14 provided on the insulating spacer 10 to the center conductor connecting portion 22 provided on the insulating spacer 21; and the side circuit-breakers 17 located on both the sides of the center circuit-breaker 17 are each offset outwardly from the straight line connecting the associated conductor connecting portions 14 and 22 to each other for ensuring the insulating distance. Accordingly, at each of the side circuit-breakers 17, the connecting direction of the conductor 24 is inclined outwardly. The circuit-breaker 17 is formed into a cylindrical shape; however, the planes of the circuit-breaker 17 in the arrangement direction are flattened, to reduce the width of the circuit-breaker 17 in the arrangement direction. The upper portions of the circuit-breakers 17 are connected to the conductor connecting portions 22 arranged in a row in the horizontal direction on the insulating spacer 21 provided between the circuit-breaker unit 2 and the line side unit 3.

The configuration of the line side unit 3 will be described below. The vessel of the line side unit 3 is composed of a cylindrical vessel portion 25*a* extending in the vertical direction and a cylindrical vessel portion 25*b* formed in the horizontal direction on the upper portion of the cylindrical portion 25*a*. Conductors 26 are connected to the conductor connecting portions 22 provided on the insulating space 21, and movable electrodes 28 reciprocated in the vertical direction by an operating device 27 provided outside the vessel of the line side unit 3 are provided at central portions of the conductors 26. The movable electrode 28 is allowed to be contacted with or separated from a fixed electrode 29. These movable electrode 28 and fixed electrode 29 constitute a disconnector. The fixed electrodes 29 are fixed on conductors 31 directly fixed on cable heads 30. The cable heads 30 are disposed in the lower portion of the cylindrical vessel portion 25*a* on the side opposed to the circuit-breaker unit 2. Lightning arresters 32 are disposed beside the cable heads 30 on the circuit-breaker unit 2 side, and transformers 33 for instruments are disposed over the cable heads 30. The cable heads 30 and the lightning arresters 32 are connected to common conductors 31. Fixed electrodes 34 of earth devices are provided on the conductors 31, and movable electrodes driven by an operating device 35 provided outside the vessel of the line side unit 3 are allowed to be contacted with or separated from the fixed electrodes 34. The transformers 33 for instruments are allowed to be contacted with or separated from the conductors 31 via separators 36.

A frame 37 on which the line side unit 3 is mounted is disposed under the line side unit 3. A bottom plate 38 is provided on the lower portion of the vessel of the line side unit 3, and connecting portions 39, to be connected to cables 40, of the cable heads 30 are extracted from the bottom plate 38 via a sealing portion, and current transformers 41 are mounted to the cables 40.

FIG. 2 is a top view of the gas insulated switching apparatus of this invention. As shown in FIG. 2, the three-phase lightning arresters 32 and the three-phase cable heads 30 in the line side unit 3 are arranged substantially along a concentric circle of the cylindrical vessel portion 25*a*, wherein the three-phase cable heads 30 are positioned opposite to the circuit-breaker unit 2 and the three-phase lightning arresters 32 are positioned on the circuit-breaker unit 2 side. With this arrangement, the workability in mounting of the current transformers 41 upon the field installation of the apparatus is improved. The disconnectors are arranged in a row, and are located at positions which are substantially the same as those of the two-phase lightning arresters 32, apart from the circuit-breaker unit 2, of the three-phase lightening arresters 32 arranged at vertexes of an isosceles triangle. In this way, the three-phase cable heads 30 and the three-phase lightning arresters 32 are arranged in the concentric circle, so that it is possible to make small the outside diameter of the cylindrical vessel portion 25*a* of the line side unit 3. Further, since the cable heads 30 and the lightning arresters 32 are arranged by the lower side of the cylindrical vessel portion 25*a* and at least the two-phase cable heads 30 are disposed close to the associated two-phase lightening arresters 32, it is possible to reduce the applied voltage ratio of the lightning arresters 32 and hence to prolong the service life of the lightning arresters 32.

Figure 3:
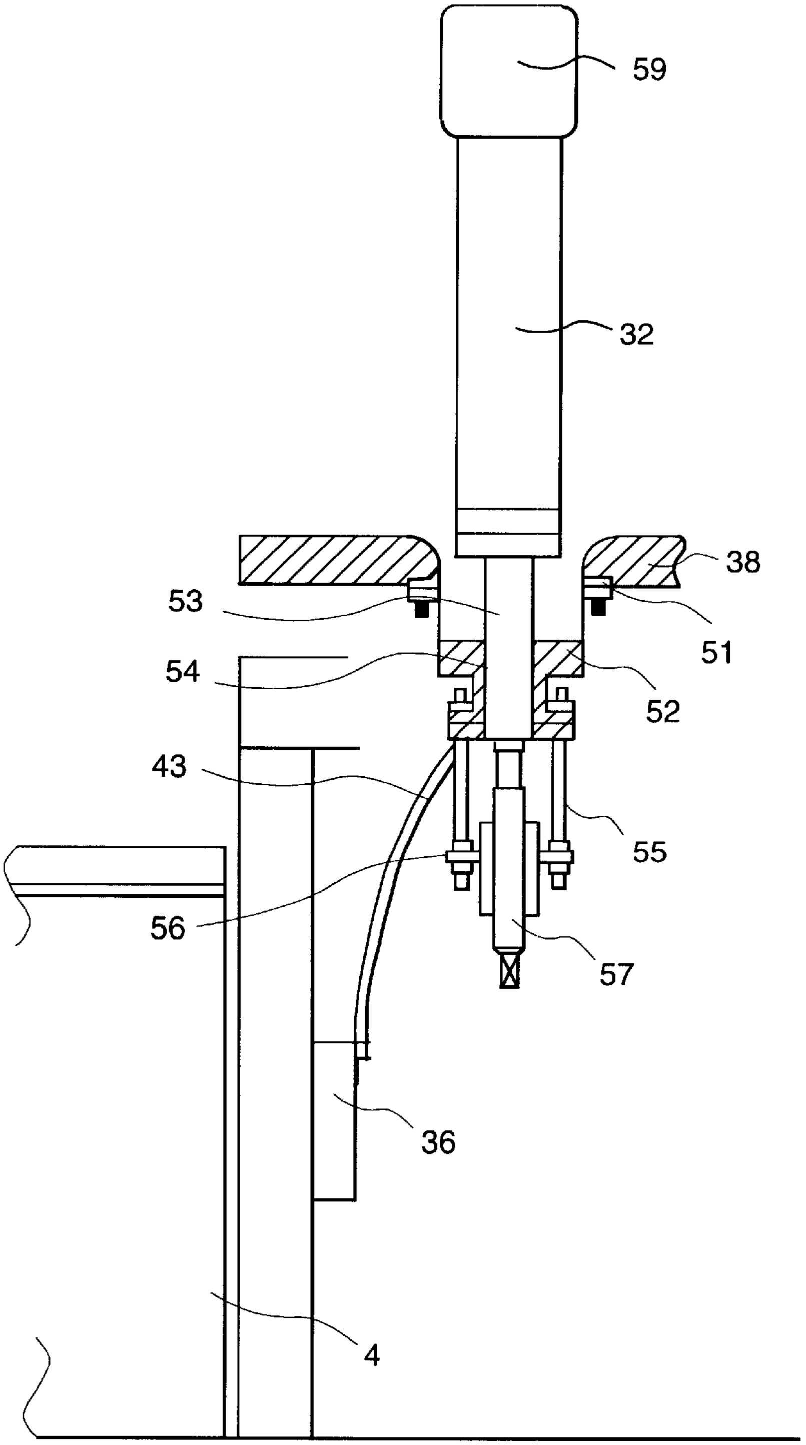
FIG. 3 is a vertical sectional view showing a separator for separating a lightning arrestor in this embodiment.

The more detailed composition of lightning arrester in FIG. 3 is shown.

A monitor 42 is mounted on a side surface of a box for housing the operating device 4 for circuit-breakers under the line side unit 3. Earth lines 43 extracted from the lower portions of the lightning arresters 32 are connected to the monitor 42. Since the earth lines 43 are extracted from the lower portions of the lightning arresters 32, it is possible to shorten the length of each earth line 43 and hence to make small a potential superimposed on the operational potential of the lightning arrester 32. As a result, it is possible to accurately operate the lightening arresters 32 at the operational potentials.

The structure for supporting each of the lightning arrestors 32 by the bottom plate 38 is shown in FIG. 3. A flange portion of a cover 52 is bolted to the bottom plate 38 via a sealing material with an insulating plate 51 put therebetween. By this structure, cover 52 and bottom plates 38 would have electrically been insulated. A cylindrical sealing terminal 53 is connected to the lower portion of the lightning arrestor 32, and the earth line 43 is mounted to the lower end of the sealing terminal 53. An O-ring 54 is provided around the inner surface portion, in which the sealing terminal 53 is to be fitted, of the cover 52 for sealing the sealing terminal 53 from the exterior. A flange is provided at the lower end of the cover 52, and is bolted on a flange portion provided on the lower end side of the sealing terminal 53. Then, cover 52 becomes a cylindrical geometry so that the lightning arresters 32 may can move for top and bottom. Therefore, it is constituted in order to be the position of bottom plates 38 located higher than bottom plate of the cover 52. By this structure, the space of line side unit 3 narrows, and the quantity of insulation gas which line side unit 3 uses is decreased. And when the condition that lightning arrester 32 is connected with conductors 31, it is constituted that the position of the height of the bottom plates 38 is located in the near place of the most grounding side of lightning arresters 32. So the electrical insulation between lightning arrester 32 and bottom plate 38 in the condition that lightning arrester 32 are connected with conductor 31 is ensured. And then, the capacity of line side unit 3 is decreased, and the quantity of insulation gas which line side unit 3 is decreased.

A connection portion between the lightning arrestor 32 and the conductor 31 has a slidable structure composed of a male portion provided on the lightning arrestor 32 side and a female portion provided on the conductor 31 side. A shield 59 is mounted on the lightning arrestor 32 side in such a manner as to cover the male portion, to relieve the electric field even if the lightning arrestor 32 is separated from the conductor 31.

Figure 4:
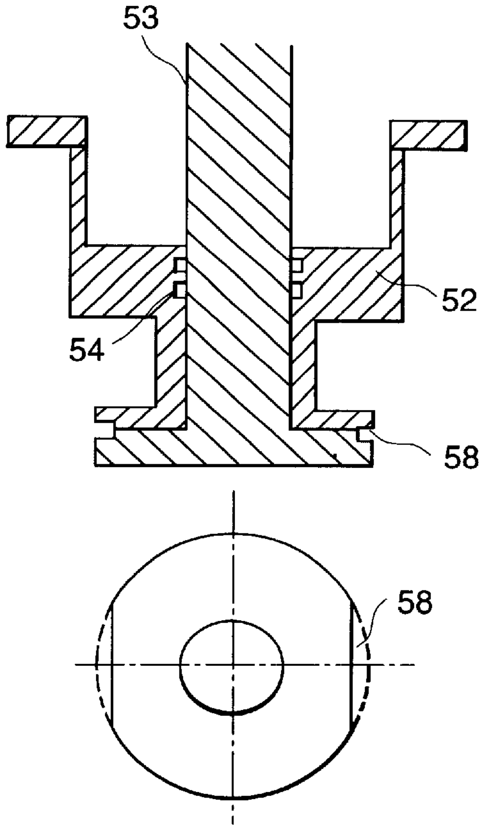
FIG. 4 is a vertical sectional view showing a sealing terminal of a lightning arrestor in another embodiment of the present invention.
Figure 5:
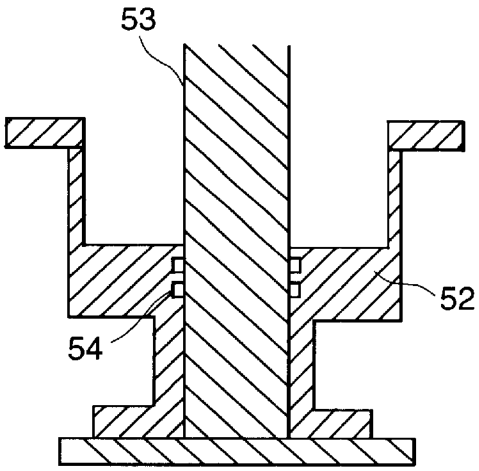
FIG. 5 is a vertical sectional view showing a sealing terminal of a lightning arrestor in a further embodiment of the present invention.

The lightning arrestor 32 is separated from the conductor 31 as follows: Namely, as shown in FIGS. 4 and 5, a fixed plate 56 having a threaded hole is mounted to the cover 52 via stud bolts 55, and a spindle 57 is pressed to the sealing terminal. In such a state, the bolts fastened in the flange formed on the lower end side of the sealing terminal 53 are removed. At this time, the lightning arrestor 32 is moved downwardly to the bottom of the cover 52 by the gas pressure in the vessel of the line side unit 3 and the dead weight of the lightning arrestor 32, so that the lightning arrestor 32 can be separated from the conductor 31 by turning the spindle 57. On the other hand, the lightning arrestor 32 is connected to the conductor 31 by turning the spindle 57 to lift the lightning arrestor 32. In addition, if it is difficult to move downwardly the lightning arrestor 32 for the reasons that the weight of the lightning arrestor 32 is light or the sealing pressure of the O-ring 54 is strong, it may be desirable to adopt a method of forming one or several grooves 58 in either or both of the cover 52 and sealing terminal 53 in the circumferential direction as shown in FIG. 4 and moving downwardly the lightning arrestor 32 by applying a force to the grooves 58. Alternatively, as shown in FIG. 5, the outside diameter of the flange of the sealing terminal 53 may be larger than the outside diameter of the flange of the cover 52. With this configuration, the lightning arrestor 32 can be moved downwardly by applying a force to the flange of the sealing terminal 53 mounted to the lightning arrestor 32.

The monitor 42 is mounted on the frame 37, and the earth line 43 extracted from the lower portion of the lightning arrestor 32 is connected to the monitor 42. Since the earth line 43 is extracted from the lower portion of the lightning arrestor 32, it is possible to eliminate the necessity of provision of a separator in the line side unit 3 and to separate the lightning arrestor by moving the lightning arrestor 32 to the underside of the bottom plate 38.

Since the lightning arrestor 32 is disposed near the ground, the length of the earth line 43 can be shortened, so that a potential superimposed to an operational potential of the lightning arrestor 32 can be reduced. As a result, the lightning arrestor 32 can be accurately operated at the operational potential.

As described above, according to the present invention, since a separator for separating a lightning arrestor serves as a sealing terminal, the number of parts can be reduced and also the separation of the lightning arrestor can be simply performed. Also, since the lightning arrestor is disposed near the ground, the length of the earth line can be shortened and thereby a potential superimposed on an operational potential of the lightning arrestor can be made small. As a result, the lightning arrestor can be accurately operated at the operational potential. Further, since the shield is mounted on the lightning arrestor side in such a manner as to cover the male portion, the electric field can be relieved even in the state in which the lightning arrestor is separated from the conductor.

What is claimed is:

1. A gas insulated switching apparatus with a line side unit having an electric power line, comprising:

at least one lightning arrestor in said line side unit, each said lightning arrestor being connected to a conductor and being movable relative to said conductor for disconnecting said arrestor from said conductor;

said line side unit having a vessel including a bottom plate and a cover having a flange that is mounted to and insulated from said bottom plate;

each said lightning arrestor having a cylindrical sealing terminal received for reciprocal movement in said cover wherein one end of said lightning arrestor passes through said flange of said cover while maintaining a sealed enclosure within said vessel for an insulating gas; and a spindle connected to said one end of said cylindrical sealing terminal and mounted to said flange of said cover for driving said each arrestor into and out of contact with said conductor from below said bottom plate.

2. A gas insulated apparatus with side line unit according to claim 1, wherein said cylindrical sealing terminal of each said arrestor has a bottom flange of a circumference that is substantially the same as a circumference of said flange of said cover and wherein said bottom flange includes at least a pair of grooves forming part of means for withdrawing said lightning arrestor from connection with said conductor.

3. A gas insulated apparatus with side line unit according to claim 1, wherein said cylindrical sealing terminal of each said arrestor has a bottom flange having a circumference greater than a circumference of said flange of said cover.

* * * * *